United States Patent [19]

Burge

[11] Patent Number: 5,203,162
[45] Date of Patent: Apr. 20, 1993

[54] COMPRESSOR BLEED MANIFOLD FOR A GAS TURBINE ENGINE

[75] Inventor: Joseph C. Burge, Palm Beach Gardens, Fla.

[73] Assignee: United Technologies Corporation, Hartford, Conn.

[21] Appl. No.: 895,966

[22] Filed: Jun. 9, 1992

Related U.S. Application Data

[63] Continuation of Ser. No. 581,230, Sep. 12, 1990, abandoned.

[51] Int. Cl.$^5$ ............................................. F02C 6/18
[52] U.S. Cl. .................................. 60/39.07; 60/39.091
[58] Field of Search ................... 60/39.07, 39.091, 726, 60/727; 55/437, 438, 465

[56] References Cited

U.S. PATENT DOCUMENTS

| | | | |
|---|---|---|---|
| 2,986,231 | 5/1961 | Hellstrom | 60/39.07 |
| 3,108,767 | 10/1963 | Eltis et al. | 60/39.07 |
| 4,155,681 | 5/1979 | Linko et al. | 60/39.091 |
| 4,870,826 | 10/1989 | Daguet et al. | 60/39.07 |
| 5,117,629 | 6/1992 | Shaw | 60/39.07 |

FOREIGN PATENT DOCUMENTS 2051771  1/1980  Fed. Rep. of Germany ..... 60/39.07

Primary Examiner—Richard A. Bertsch
Assistant Examiner—Timothy S. Thorpe
Attorney, Agent, or Firm—Norman Friedland

[57] ABSTRACT

The compressor customer bleed includes annular spaced walls defining the bleed manifold and staggered openings bleeding compressor air externally of the gas turbine engine avoiding a clear path for a hot particle to the most outer wall and including a thickened wall serving as a heat sink to dissipate the heat of the particle.

10 Claims, 1 Drawing Sheet

COMPRESSOR BLEED MANIFOLD FOR A GAS TURBINE ENGINE

The invention was made under a U.S. Government contract and the Government has rights herein.

This is a continuation of U.S. patent application Ser. No. 07/581,230 filed Sep. 12, 1990 now abandoned.

CROSS REFERENCE

The subject matter of this application is related to the subject matter of the following commonly assigned patent applications:

U.S. application Ser. No. 581,223, now allowed, entitled "Fastener For Multi-Stage Compressor"; U.S. application Ser. No. 581,224, now U.S. Pat. No. 5,131,811 entitled "Case Tying Means For A Gas Turbine Engine"; U.S. application Ser. No. 581,229, now abandoned entitled "Segmented Stator Vane Seal"; U.S. application Ser. No. 581,228, now abandoned entitled "Backbone Support Structure For Compressor"; U.S. application Ser. No. 581,227 now U.S. Pat. No. 5,118,253 entitled "Compressor Case Construction With Backbone"; U.S. application Ser. No. 581,219, now abandoned, entitled "Compressor Case Construction"; U.S. application Ser. No 581,240, now U.S. Pat. No. 5,127,797 entitled "Compressor Case Attachment Means"; U.S. application Ser. No. 581,220, now U.S. Pat. No. 5,127,794 entitled "Compressor Case With Controlled Thermal Environment"; all of the above filed on Sep. 10, 1990.

1. Technical Field

This invention relates to compressors for gas turbine engines and more particularly to the compressor bleed that supplies air for use on auxiliary equipment in the airplane.

2. Background Art

The turbine power plant in addition to generating thrust to power aircraft is also utilized to supply pressurized air to support other mechanism, such as air conditioners, pressurization, power units for electric generators and the like. For this purpose, the engine conventionally contains a bleed port for supplying the requisite pressurized air. Typically, the air is fed directly into an annular chamber formed in the engine's casing defining a manifold and is ported through various ports communicating with the manifold.

Under ordinary circumstances, in an engine where fire may occur in proximity to the manifold, precaution must be observed so as to contain the fire and prevent it from rupturing the skin of the outer case. This is a particular problem where titanium material is used and which material is subjected to a rubbing condition. The rub may cause a hot particle to dislodge and obviously this hot or secondary particle must not be allowed to injure the engine or cause a malfunction.

I found that I can obviate the problems noted above and provide an acceptable compressor bleed system that is not susceptible to damage or occasioned by dislodged hot particles of titanium. This invention contemplates staggering bleed holes formed in the case internal walls so there is no direct line of sight for a dislodged particle to travel to the outer structural casing wall.

STATEMENT OF THE INVENTION

An object of this invention is to provide an improved bleed port for bleeding air from the compressor section of a gas turbine power plant.

A feature of this invention is to provide an inner wall formed in the inner diameter of the engine case having axially spaced apertures communicating with an annular cavity defined by the case and a cavity is fed through an opening disposed in a location that directs compressor air on the wall surface extending between said apertures.

The foregoing and other features and advantages of the present invention will become more apparent from the following description and accompanying drawings.

BEST MODE FOR CARRYING OUT THE INVENTION

Figure 1:
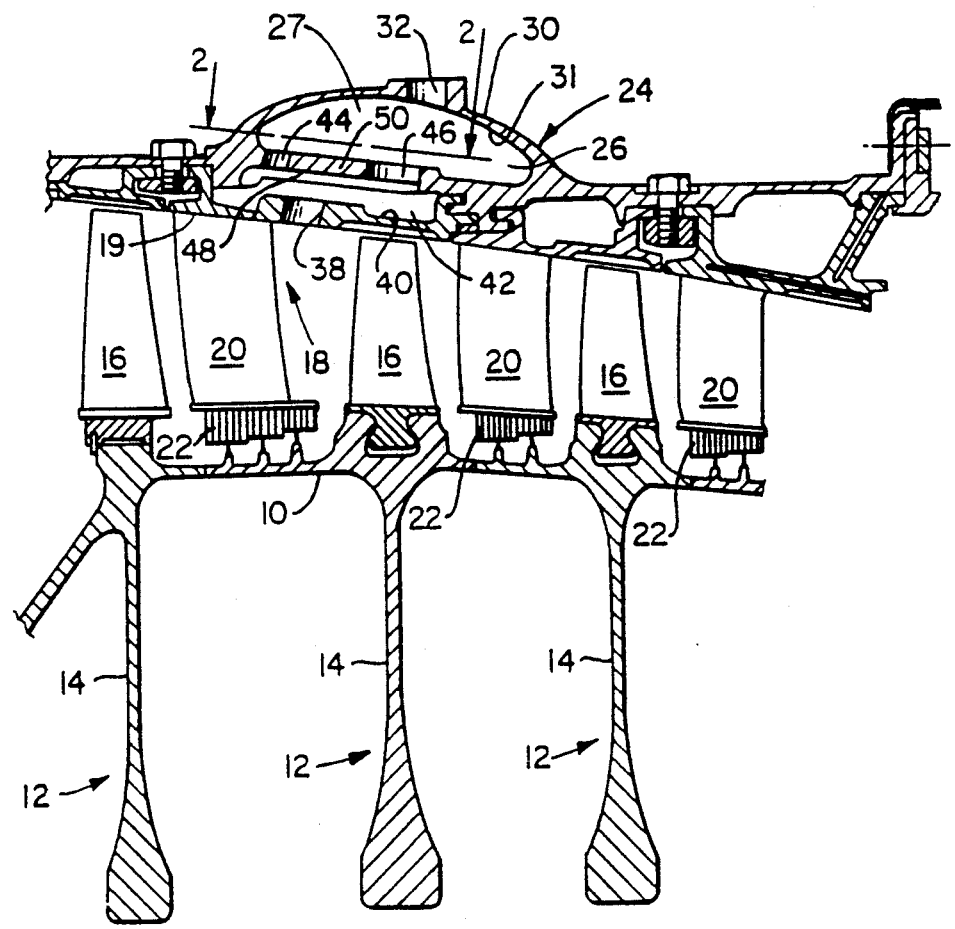
FIG. 1 is a partial view of a compressor and bleed for a gas turbine power plant showing the details of this invention.
Figure 2:
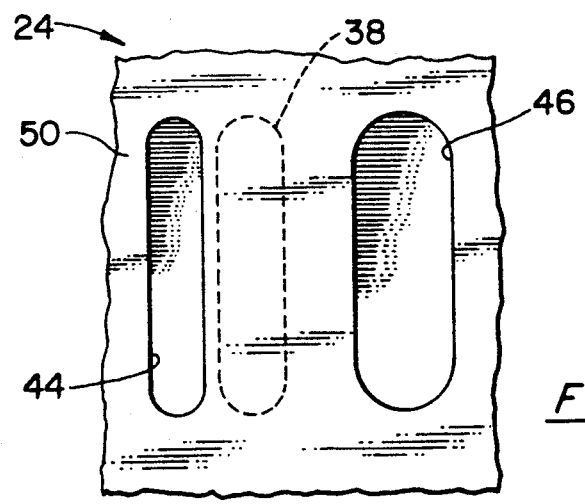
FIG. 2 is a partial and end view taken along lines 2—2 of FIG. 1.

For the sake of convenience and simplicity only that portion of an axial flow compressor for a gas turbine power plant that is necessary to describe this invention is disclosed herein. Additional details of a gas turbine engine where this invention is practiced can be had by referring to the F-100 family of engines manufactured by Pratt & Whitney of United Technologies Corporation, the assignee common to the assignee of this patent application. The bleed for the air in the compressor, usually referred to as customer's bleed, is located at an intermediate stage of the multi-stage compressor. Only a portion of the multi-stage axial flow compressor is shown and as depicted in FIG. 1 this compressor section is a portion of the high pressure compressor which is mounted downstream of and in flow relationship to the low pressure compressor. The compressor consists of a drum rotor 10 which is essentially a cylinder having supported thereto a plurality of compressor stages 12. Each stage includes a disk 14 supporting a plurality of circumferentially spaced axial flow compressor blades 16. Stators, generally indicated by referenced numeral 18, carry circumferentially spaced stator vanes 20 mounted adjacent to each of the banks of blades for removing the swirl component of the discharging air and admitting the air to the next stage at the desired angle of attack.

It will be appreciated that the drum rotor rotates causing the blades to rotate. Labyrinth seals 22 at the foot of the stator vane cooperate with the teeth formed on the drum rotor to minimize leakage of gas path air between compressor stages. The stator structure of the stator 18 and drum rotor 10 form an inner and outer boundary for defining the engine's gas path flowing axially from a left to right direction as depicted in the drawing.

Essentially, the stator defines an inner case 19 supported to the outer case generally indicated by reference numeral 24. The compressor bleed comprises the bleed manifold 26 formed within the walls 50 and 30 of case 24. The bleed manifold is angularly shaped and circumscribes the rotor assembly and essentially is an annular cavity which communicates with ports 32 located in the wall 30 of the outer case 24 which serves as the customer's bleed. A continuous stream of air from the gas path is ported to the annular cavity through a drilled passage 38 formed in wall 40 of stator 18 through cavity 42 (the annular space between the inner and outer cases) and two banks of circumferentially spaced slots 44 and 46.

It is apparent from the foregoing that the wall 50 extending between the two banks of slots 44 and 46 provides a barrier between the wall 30 of the outer case 24 and the passage 38.

Hence, should a blade fabricated from titanium rub and result in a hot particle dislodging, the path of the incendiary particle would be obstructed by the inner surface 48 of the wall 50. This obstruction serves to protect the inner surface 31 of wall 30, (which is relatively thin compared to the wall 50), from being inadvertently damaged. The protection is manifested in two ways. First, the incendiary particles impinge on this wall before being allowed to be admitted into cavity 26 and second, wall 50 being relatively thicker than wall 30 serves as a heat sink which absorbs some of the heat of the incendiary particles, reducing its temperature before it is able to impinge on surface 31 of wall 30. It will be noted and in accordance with this invention the operature 38 and 44 are all parallel to each other resulting in a smaller envelope for the bleed manifold with a consequential reduction in overall weight.

Although the invention has been shown and described with respect to detailed embodiments therof, it will be understood by those skilled in the art that various changes in form and detail therof may be made without departing from the spirit and scope of the claimed invention.

What is claimed:

1. Means for protecting the bleed manifold formed from the outer case of a gas turbine engine, said engine having a compressor section including a drum rotor defining an inner boundary for the engine's gas path and for supporting a plurality of compressor stages each of which comprises a row of circumferentially spaced axial flow blades, stator means including wall means defining an inner case radially spaced and coaxially disposed relative to said drum rotor defining an outer boundary for said gas path, means for defining the bleed manifold consisting essentially of a bowed wall formed from a portion of the outer case of said gas turbine engine radially spaced and coaxially disposed relative to said inner case of said drum rotor, and an inner annular wall portion and said bowed wall both being concentrically disposed relative to said outer boundary defining an annular cavity, said inner annular wall portion creating a heat sink and being spaced from said inner case, means for leading a portion of said gas path out of said gas turbine engine through said annular cavity including a first opening in said inner case for flowing a continuous stream of fluid susceptible of including incendiary particles entrained therein, a second opening in said inner annular wall portion parallelly disposed relative to said first opening for leading said stream of fluid into said annular cavity, and a bleed port in said bowed wall, said first opening and said second opening being laterally spaced relative to each other so that said stream of fluid and said incendiary particles entrained therein ingested in said first opening impinges on said inner annular wall portion prior to being ingested into said annular cavity so that heat is dissipated from said incendiary particles by said inner wall for protecting said outer case.

2. Means for protecting the bleed manifold as claimed in claim 1 wherever said stator means includes a plurality of rows of stator vanes associated with each fow of circumferentially spaced axial flow blades and said first opening is disposed between a row of said stator vanes and a row of blades.

3. Means for protecting the bleed manifold as claimed in claim 2 wherein said first opening includes a plurality of circumferentially spaced aperatures.

4. Means for protecting the bleed manifold as claimed in claim 3 wherein said spaced aperatures are slots extending circumferentially about said outer boundary.

5. Means for protecting the bleed manifold as claimed in claim 4 wherein said second opening includes a plurality of second circumferentially spaced aperatures.

6. Means for protecting the bleed manifold as claimed in claim 5 wherein said second aperatures are slots.

7. Means for protecting the bleed manifold as claimed in claim 1 including a third opening in said inner annular wall portion axially spaced from said second opening and disposed laterally from said first opening whereby incendiary particles ingested into said first opening impinges on said inner annular wall portion at a location intermediate said second opening and said third opening.

8. Means for protecting the bleed manifold as claimed in claim 7 wherein said first opening, said second opening and said third opening include a plurality of circumferentially spaced aperatures.

9. Means for protecting the bleed manifold as claimed in claim 8 wherein said aperatures are elongated slots.

10. Means for protecting the bleed manifold as claimed in claim 2 including a boss formed on the outer surface of said bowed wall and said bleed port being disposed in said boss.

* * * * *